(No Model.)
A. J. PEAVEY.
IMPLEMENT FOR PERFORATING AND CLIPPING CIGARS.
No. 282,764. Patented Aug. 7, 1883.
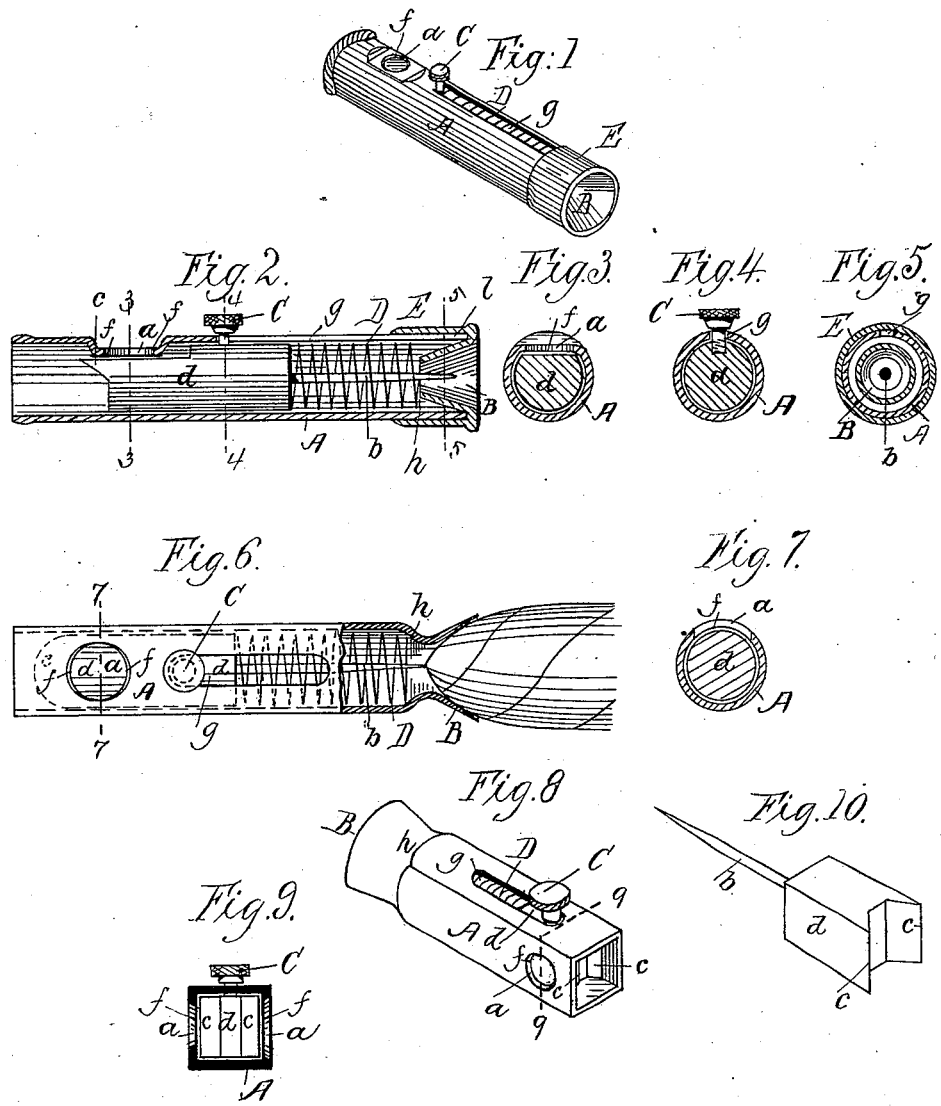
Witnesses:
Wm. S. Bellows.
Nellie Doble.
A. J. Peavey,
Inventor,
per Brown Bros.
Attorneys.

UNITED STATES PATENT OFFICE.

ANDREW J. PEAVEY, OF SOMERVILLE, MASSACHUSETTS.

IMPLEMENT FOR PERFORATING AND CLIPPING CIGARS.

SPECIFICATION forming part of Letters Patent No. 282,764, dated August 7, 1883.

Application filed February 26, 1883. (No model.)

*To all whom it may concern:*

Be it known that I, ANDREW J. PEAVEY, of Somerville, in the county of Middlesex and State of Massachusetts, have invented certain new and useful Improvements in Implements for Piercing and Clipping Cigars, of which the following is a full, clear, and exact description.

This improved implement for piercing and clipping cigars in substance is composed of a tube or hollow cylinder which has one end open, and also has between its two ends either one or more openings to receive the tip end of a cigar, and has arranged within it a piercer to pierce a cigar placed in the end of the tube along the length of the cigar, and a knife or other cutting edge or edges to cut or sever the tip of a cigar placed on either of the intermediate openings of the tube, all substantially as hereinafter described.

In the accompanying plate of drawings the present improved implement is illustrated on an enlarged scale and in various forms and shapes, but all having substantially the same construction.

Figure 1 is a perspective view of one form of the implement, and Fig. 2 a longitudinal vertical section of Fig. 1; Figs. 3, 4, and 5, cross-sections on lines 3 3, 4 4, and 5 5, respectively, of Fig. 2; Fig. 6, part side view and longitudinal section of another form of the implement; Fig. 7, a cross-section of Fig. 6 on line 7 7; Fig. 8, a perspective view of another form of the implement; Fig. 9, a cross-section of Fig. 8 on line 9 9, and Fig. 10 a perspective view of cutter and piercer of the implement detached.

In the drawings, A represents a tube or hollow cylinder. This tube A has an opening, B, at one end, made interiorly of a conical shape and similar to the tip end of a cigar, and between its two ends an opening, $a$, Figs. 1, 2, 3, 6, and 7, or openings $a\,a$, Fig. 9, in the sides of the tube, and each of suitable shape for the tip end of a cigar, if placed therein, to enter into the interior of the tube.

$b$ is a piercer, and $c$ a knife or cutting edge, Fig. 2, or edges $c\,c$, Figs. 9 and 10, carried by a block, $d$, to which block the piercer $b$ is secured.

The block $d$ is shaped to fit the inside of the tube, and its knife edge or edges $c\,c$ are located so that on the sliding of the block forward and backward through the tube said edges will pass by the edges $f$ of the intermediate openings, $a\,a$, of the tube, and thus clip or sever the tip end of the cigar which may be placed therein, and its piercer is located so that in the sliding of the block forward and backward through the tube it can be made to enter into and be withdrawn from the cigar-tip placed in the conical-shaped open end B of the tube, and thereby to pierce the same in its length. For sliding the block, as above stated, a handle or knob, C, is provided, which knob is attached to the block and projects to the outside of the tube through a slot, $g$, running lengthwise of the tube; and for automatically withdrawing the piercer after piercing a cigar a coiled spring, D, is arranged within the tube and confined between the block $d$ and shoulder $h$ at conical open end of the tube. The end of the tube opposite to that of the conical end B is often left open, and thus escape for the clippings of tobacco is offered.

When the implement is not in use, if a spring, D, is used, the piercer is kept within the tube and the side openings, $a$, closed by the knife-block, and the implement can then be carried with safety in the pocket; and obviously the spring is of utility in that respect, as also in the respect that it renders the movement of the piercer and knife in one direction automatic; but yet it is not intended to limit the invention thereto.

The changes in form are obvious on inspection of the drawings. Again, with two or more side openings, by giving each a different size, the implement is adapted to varying sizes of cigar-tips.

In Figs. 1, 2, and 5 the conical opening B is formed in a cap, E, securely attached to the end $l$ of the tube in any suitable manner, and in Figs. 6 and 8 the conical opening is made in and of the tube itself.

A simple mode of securing the cap E is to make the outer end, $l$, of the tube sufficiently flaring or bell-shaped to securely hold the cap when placed thereon by the spring of the metal, the slot being in such case open to the end $l$ and facilitating such attachment.

The cutting-knife can be convex to conform to the shape of the tube, or flat and the tube flattened to meet the same. The opening B at the end can be straight and of same size of the tube, in lieu of being conical shape; and it is not intended to limit the invention to a conical-shaped opening, although it is preferable to have the opening of a conical shape.

Having thus described my invention, what I claim, and desire to secure by Letters Patent, is—

1. An implement for clipping and piercing cigars at their tip ends, composed of a tube, A, having an open end and opening or openings a, in combination with a piercer, b, and a severing edge or edges, c, arranged to slide forward and backward within said tube, substantially as and for the purpose described.

2. An implement for clipping and piercing cigars at their tip ends, composed of a tube, A, having an open end, B, and opening or openings a, in combination with a piercer, b, and a severing edge or edges, c, arranged to slide forward and backward within said tube, and a spring, D, substantially as and for the purpose described.

3. An implement for clipping and piercing cigars at their tip ends, composed of a tube, A, having conical-shaped open end B and opening or openings a, in combination with a piercer, b, and a severing edge or edges, c, arranged to slide forward and backward within said tube, substantially as and for the purpose described.

4. An implement for clipping and piercing cigars at their tip ends, composed of a tube, A, having conical-shaped open end B and opening or openings a, in combination with a piercer, b, and a severing edge or edges, c, arranged to slide forward and backward within said tube, and a spring, D, substantially as and for the purpose described.

In testimony whereof I have hereunto set my hand in the presence of two subscribing witnesses.

ANDREW J. PEAVEY.

Witnesses:
EDWIN W. BROWN,
W. S. BELLOWS.